United States Patent
Rohloff

(10) Patent No.: US 9,313,181 B2
(45) Date of Patent: Apr. 12, 2016

(54) SYSTEM AND METHOD TO MERGE ENCRYPTED SIGNALS IN DISTRIBUTED COMMUNICATION SYSTEM

(71) Applicant: RAYTHEON BBN TECHNOLOGIES CORP., Cambridge, MA (US)

(72) Inventor: Kurt Ryan Rohloff, South Hadley, MA (US)

(73) Assignee: Raytheon BBN Technologies Corp., Cambridge, MA (US)

(*) Notice: Subject to any disclaimer, the term of this patent is extended or adjusted under 35 U.S.C. 154(b) by 18 days.

(21) Appl. No.: 14/194,585

(22) Filed: Feb. 28, 2014

(65) Prior Publication Data

US 2015/0249649 A1 Sep. 3, 2015

(51) Int. Cl.
| | | |
|---|---|---|
| H04L 29/06 | (2006.01) | |
| H04K 1/00 | (2006.01) | |
| H04L 9/00 | (2006.01) | |
| H04L 9/30 | (2006.01) | |

(52) U.S. Cl.
CPC .............. *H04L 63/0471* (2013.01); *H04K 1/00* (2013.01); *H04L 9/008* (2013.01); *H04L 9/3093* (2013.01)

(58) Field of Classification Search
CPC ....... H04L 63/0471; H04L 9/06; H04L 9/008; H04L 9/28; H04L 9/08
USPC .......................................................... 713/153
See application file for complete search history.

(56) References Cited

U.S. PATENT DOCUMENTS

| | | | |
|---|---|---|---|
| 6,477,652 B1* | 11/2002 | Yen et al. .......................... 726/26 |
| 6,986,044 B1* | 1/2006 | Inada ............................. 713/170 |
| 7,373,517 B1 | 5/2008 | Riggins | |
| 8,363,744 B2* | 1/2013 | Agee et al. ..................... 375/267 |
| 2003/0044017 A1* | 3/2003 | Briscoe ......................... 380/277 |
| 2003/0163697 A1* | 8/2003 | Pabla et al. .................... 713/171 |
| 2009/0063861 A1 | 3/2009 | Chu | |
| 2010/0220856 A1* | 9/2010 | Kruys et al. .................... 380/44 |
| 2011/0085665 A1 | 4/2011 | Hong et al. | |
| 2011/0293093 A1 | 12/2011 | Sun et al. | |
| 2012/0243681 A1 | 9/2012 | Francis | |
| 2013/0142336 A1 | 6/2013 | Fries et al. | |

(Continued)

OTHER PUBLICATIONS

"Secure Voice over IP (SVoIP) vs. Voice over Secure IP (VOSIP) Installations", General Dynamics, C4 Systems, 2010 (4 pgs.).

(Continued)

*Primary Examiner* — Matthew Smithers
(74) *Attorney, Agent, or Firm* — Lewis Roca Rothgerber Christie LLP

(57) ABSTRACT

In a computer implemented method for data privacy in a distributed communication system including a plurality of client terminals, the method includes: receiving, from each of the plurality of client terminals, a group of key switch hints generated by said each of the client terminals, wherein each group of key switch hints include a key switch hint corresponding to each other one of the client terminals; receiving, from each of the client terminals, an encrypted data stream; switching each of the encrypted data streams using the key switch hints corresponding to said each other one of the client terminals to generate a respective switched data set for said each of the encrypted data streams, wherein each switched data set includes a plurality of encrypted data representations of said each of the encrypted data streams; and generating an encrypted output data stream for each of the client terminals using the switched data set for each encrypted data stream.

20 Claims, 8 Drawing Sheets

(56) References Cited

U.S. PATENT DOCUMENTS

| | | | |
|---|---|---|---|
| 2013/0216044 A1 | 8/2013 | Gentry et al. | |
| 2013/0272521 A1* | 10/2013 | Kipnis et al. | 380/44 |
| 2013/0318347 A1* | 11/2013 | Moffat | 713/168 |
| 2014/0334624 A1* | 11/2014 | Bernsen | 380/279 |
| 2015/0249649 A1 | 9/2015 | Rohloff | |

OTHER PUBLICATIONS

Dunte, et al., "Secure Voice-over-IP", IJCSNS International Journal of Computer Science and Network Security, vol. 7, No. 6, Jun. 2007 (pp. 63-68).

Gentry, "A Fully Homomorphic Encryption Scheme", Dissertation Submitted to the Department of Computer Science and the Committee on Graduate Studies of Stanford University in Partial Fulfillment of the Requirements for the degree of Doctor of Philosophy, Sep. 2009 (209 pgs.).

Gentry, "Computing Arbitrary Functions of Encrypted Data", Communications of the ACM, vol. 53, No. 3, Mar. 2010 (pp. 97-105).

Gentry, et al., "A Working Implementation of Fully Homomorphic Encryption", IBM T.J. Watson Research Center, 2009 (5 pgs.).

Halevi, et al., "Design and Implementation of a Homomorphic-Encryption Library", Apr. 11, 2013 (46 pgs.).

Lyubashevsky, et al., "A Toolkit for Ring-LWE Cryptography", May 16, 2013 (51 pgs.).

* cited by examiner

SYSTEM AND METHOD TO MERGE ENCRYPTED SIGNALS IN DISTRIBUTED COMMUNICATION SYSTEM

STATEMENT REGARDING FEDERALLY SPONSORED RESEARCH OR DEVELOPMENT

This invention disclosure is related to a government contract number FA8750-11-C-0098. The U.S. Government has certain rights to this invention.

FIELD

Aspects of embodiments of the present invention relate to a system and method to merge encrypted signals in a distributed communication system.

BACKGROUND

A typical system for enabling multiple entities to exchange data or communicate with one another may include a form of a distributed communication system, in which multiple parties to a communication are connected to each other through a network and a central hub or switch. In many circumstances, where the data being exchanged includes sensitive information, it can be important to maintain privacy from external security threats. Additionally, in some circumstances, the network itself may not be reliably secure or trustworthy. For example, various parties engaging in a Voice over Internet Protocol (VoIP) teleconference may be speaking about sensitive information from various trusted locations throughout the world, but the telecommunication system or the central data mixer used to transmit data between the parties may not be secure or trustworthy. Thus, privacy or security concerns may arise in encrypted communication systems, for example, encrypted VoIP teleconferencing systems, where encryption keys must be shared with the central data mixer.

SUMMARY

In some embodiments, the present invention is directed to a system and method for merging encrypted data without sharing a private key for every teleconference session.

In some embodiments, the present invention is a computer implemented method for data privacy in a distributed communication system including a plurality of client terminals, the method including: receiving, from each of the plurality of client terminals, a group of key switch hints generated by said each of the client terminals, wherein each group of key switch hints includes a key switch hint corresponding to each other one of the client terminals; receiving, from each of the client terminals, an encrypted data stream; switching each of the encrypted data streams using the key switch hints corresponding to said each other one of the client terminals to generate a respective switched data set for said each of the encrypted data streams, wherein each switched data set includes a plurality of encrypted data representations of said each of the encrypted data streams; and generating an encrypted output data stream for each of the client terminals using the switched data set for each encrypted data stream.

In some embodiments, the present invention is a computer implemented method for data privacy in a distributed communication system coupled to first, second, and third client terminals, the method including: receiving, from the first client terminal, a first key switch hint corresponding to the second client terminal and a second key switch hint corresponding to the third client terminal; receiving, from the second client terminal, a third key switch hint corresponding to the first client terminal and a fourth key switch hint corresponding to the third client terminal; receiving, from the third client terminal, a fifth key switch hint corresponding to the first client terminal and a sixth key switch hint corresponding to the second client terminal; receiving an encrypted data stream from the first, second, and third client terminals; switching the encrypted data stream received from the first client terminal using the first key switch hint and the second key switch hint to generate a first encrypted data representation; switching the encrypted data stream received from the second client terminal using the third key switch hint and the fourth key switch hint to generate a second encrypted data representation; switching the encrypted data stream received from the third client terminal using the fifth key switch hint and the sixth key switch hint to generate a third encrypted data representation; and generating first, second, and third encrypted output data streams each corresponding to the first, second, and third client terminals, respectively, using the first, second, and third encrypted data representations.

In some embodiments, the present invention is a central communication hub in a distributed communication system, the central communication hub including: an input port for receiving a first group of key switch hints and a first encrypted data stream; one or more switching circuits configured to switch the first encrypted data stream using the first group of key switch hints to generate a first switched data set; a demultiplexer for generating an encrypted output data stream using the first switched data set; and an output terminal for providing the encrypted output data stream to a client terminal.

BRIEF DESCRIPTION OF THE DRAWINGS

A more complete appreciation of the present invention, and many of the attendant features and aspects thereof, will become more readily apparent as the invention becomes better understood by reference to the following detailed description when considered in conjunction with the accompanying drawings in which like reference symbols indicate like components, wherein.

DETAILED DESCRIPTION

Aspects of embodiments of the present invention relate to a system and method to merge encrypted signals in a distributed communication system, for example, Voice over Internet Protocol (VoIP) teleconferencing systems, video conferencing systems, control systems, detection systems, or accounting systems.

In some embodiments, the present invention is a system and method for merging encrypted data in a distributed communication system using key switch hints generated by a trusted third party prior to initiating a communication session.

In some embodiments, the present invention provides a system and method for users operating client terminals to engage in privacy-preserving communication sessions, for example, teleconferencing, where communication privacy is maintained despite all communications by the client terminals (or clients) being observed during the communication session, even at a central communication hub (e.g., a teleconference mixer). The client terminals may share public keys with each other at a time that is convenient, and there is no need to protect the public keys to preserve privacy. Based on the public keys received from each of the other client terminals and a private key generated by each client terminal, each client terminal generates key switch hints corresponding to each of the other client terminals.

The key switch hints are used to delegate decryption capability from one client terminal to another. After delegating decryption capability to an intended client terminal, the client terminal can decrypt the data delegated.

Embodiments of the invention may use a suitable encryption technique agreed upon by each of the client terminals, for example, additive homomorphic encryption, such that all clients may generate their own private key and their own public keys according to the agreed-upon encryption technique. Client terminals may encode analog data signals (e.g., a user's voice) into a digital data stream using an additive encoding scheme, and encrypt the encoded digital data stream using a suitable encryption scheme, such as an additive homomorphic encryption scheme. The client terminals may then transmit the encrypted data stream to a central communication hub (e.g., a mixer), where the central communication hub operates to switch the encrypted data stream received from each client terminal into a representation that can be decrypted using each client terminal's private key. The central communication hub may then combine the switched data streams, for example, using an encrypted homomorphic addition. The central communication hub may then de-multiplex the combined switched data streams into individual output encrypted data streams that can be decrypted by an intended receiver, and then send the result to the intended recipient. The recipient can then decrypt, decode, and play back the result.

Figure 1:
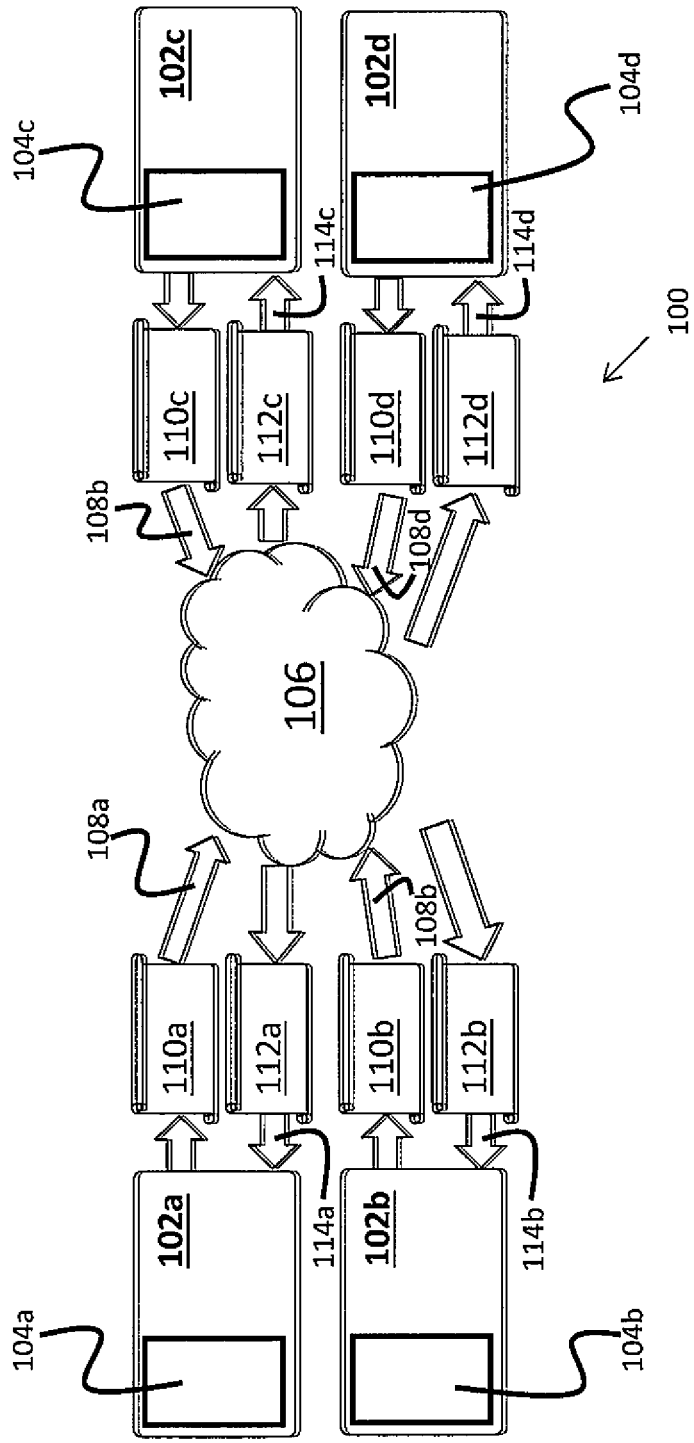
FIG. 1 illustrates a distributed communication system and plurality of entities or clients engaging in electronic communication in a distributed communication system, according to some embodiments of the present invention.

FIG. 1 illustrates a distributed communication system 100 and plurality of entities or clients 102a-102d engaging in electronic communication in a distributed communication system. The number of clients may vary according to the design and function of the communication system 100. Each of the client terminals 102a-102d includes one or more communication devices 104a-104d, respectively. The communication devices 104a-104d may be any suitable communication device configured to receive and process data communication signals over the distributed communication system 100. In one embodiment, the communication devices 104a-104d include Voice over Internet Protocol (VoIP) enabled telephones, capable of placing and transmitting telephone calls over an IP network (e.g., the Internet).

One or more of the communication devices 104a-104d may also include a cellular telephone, smartphone, tablet computer, personal computer, or other suitable communication device with computing and connectivity capability that is capable of processing digital communications data, and transmitting and receiving digital communications data over a network. In one embodiment, one or more of the communication devices 104a-104d may include a public switched telephone network (PSTN) telephone in electrical communication with an analog telephone adapter capable of converting analog data signals to digital data signals for communication over a digital communication network (e.g., the Internet). In the case of a PSTN telephone communication network, the distributed communication system may further include components capable of encoding, encrypting, and decrypting a digital communication signal for interface with the analog PSTN network. Each of the communication devices 104a-104d may additionally include a microphone and a speaker for receiving and producing audible analog sound for users of the client terminals 102a-102d.

Each of the client terminals 102a-102d is in electronic communication with a central hub or mixer 106 by way of communication channels 108a-108d, respectively. The central communication hub 106, for example, a mixer, may be any suitable electronic mixer capable of combining two or more electrical or data signals into one or more composite output signals. In one embodiment, the mixer 106 is a VoIP-enabled mixer. The communication channels 108a-108d may be uni-directional or bi-directional and transmit data between the client terminals 102a-102d and the mixer 106 in a wired or wireless configuration.

During a communication session over the distributed communication network 100, each of the clients 102a-102d receive analog or digital data signals (e.g., audio and video provided by the user of the clients 102a-102d), and provide a digital encrypted version of the analog or digital data signals over the respective communication channels 108a-108d in the form of encrypted data streams 110a-110d. For example, during a VoIP teleconference session, each of the client terminals 102a-102d may sample analog voice data using the audio capturing capabilities of the respective communication devices 104a-104d, encode the analog samples into digital data packets at regular intervals, and encrypt each of the digital data packets to create the encrypted data streams 110a-110d. The encoded data packets may be encrypted into the encrypted data streams 110a-110d using any suitable encryption scheme or algorithm, such as the NTRU encryption algorithm modified to provide either Somewhat Homomorphic Encryption (SHE) or Fully Homomorphic Encryption (FHE) capabilities.

The mixer 106 receives the encrypted data streams 110a-110d from each of the client terminals 102a-102d, respectively, and mixes the encrypted data streams 110a-110d according to the design and function of the distributed communication network 100 to generate one or more composite encrypted result data steams 112a-112d. The composite encrypted result data streams 112a-112d may include a composite of all of the encrypted data streams 110a-110d, or may selectively include only a portion of the encrypted data streams 110a-110d. For example, the composite encrypted result data stream 112a, intended to be transmitted to the client 102a, may include a composite of all of the encrypted data streams 110a-110d, or alternatively, may include only a composite of the encrypted data streams 110b-110d, with the encrypted data stream 110a generated by the client 102a not being included in the composite encrypted result data stream 112a, to improve the perceived sound quality for the user of the client 102a.

After generating the composite encrypted result data streams 112a-112d, the mixer 106 transmits the composite encrypted result data streams 112a-112d to each of the client terminals 102a-102d, respectively, by way of communication channels 114a-114d. The communication channels 114a-

114d may be uni-directional or bi-directional and transmit data between the mixer 106 and the client terminals 102a-102d in a wired or wireless configuration. Each of the clients 102a-102d then decrypts the respective composite encrypted result data stream 112a-112d that they receive using private or secret keys held by each of the clients 102a-102d, and if necessary, decodes the decrypted data stream into an analog data stream, and plays the decoded and decrypted data stream using the corresponding communication device 104a-104d.

According to the above process illustrated in FIG. 1, each of the client terminals 102a-102d transmits an encrypted data stream 110a-110d to the central mixer 106 that is pre-encrypted. That is, the encryption of the data is not performed by the mixer 106, but instead is performed at the client side of the communication, thereby improving privacy within the distributed communication system 100.

Figure 2:
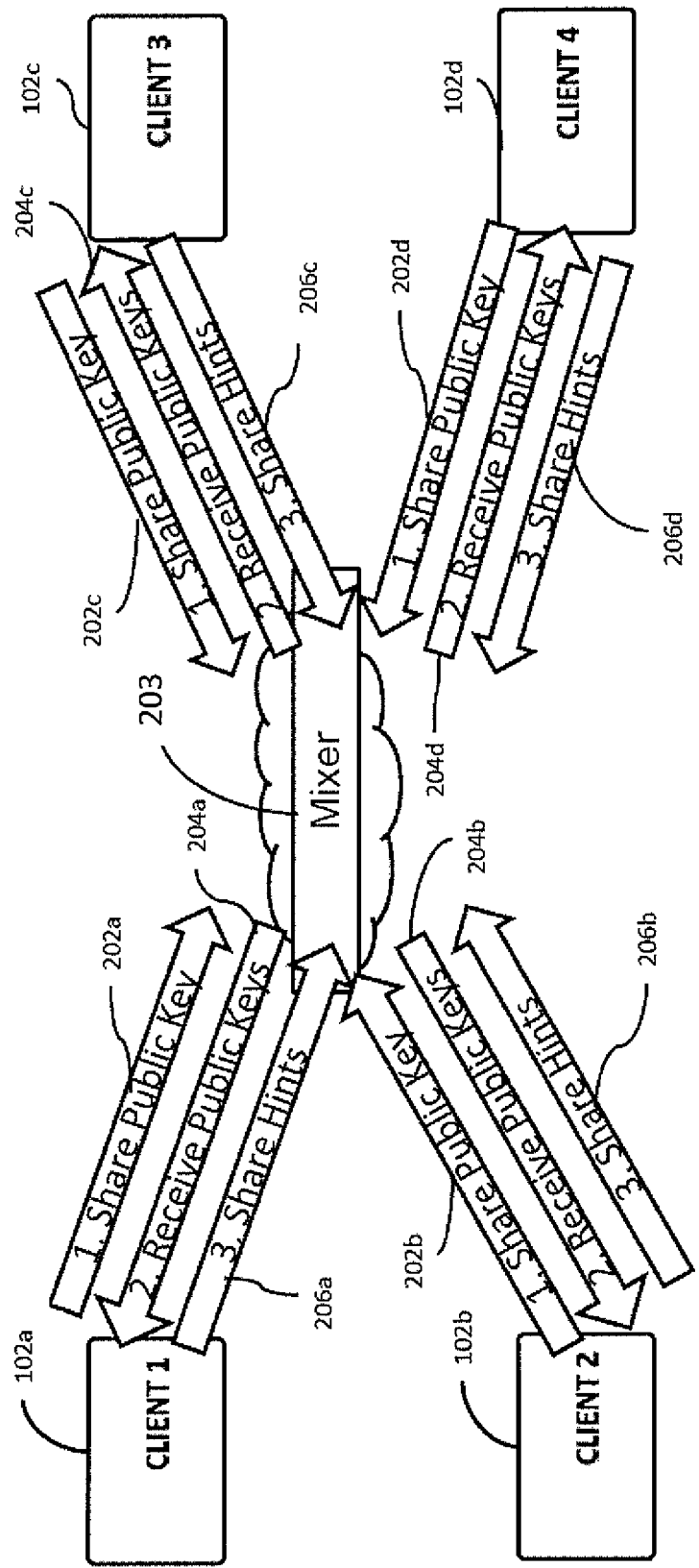
FIG. 2 illustrates an example of a block diagram depicting keys and hints sharing, according to some embodiments of the present invention.

FIG. 2 shows an exemplary block diagram depicting keys and hints sharing, according to some embodiments of the present invention. As shown in FIG. 2, each of the client terminals (clients) 102a, 102b, 102c, and 102d provide a public key 202a, 202b, 202c, and 202d, respectively, to the central communication hub or mixer 203. The mixer 203, in turn, provides a group of public keys 204a, 204b, 204c, and 204d back to each of the client terminals 102a-102d, respectively. The groups of public keys 204a-204d each include the public keys from each of the other client terminals 102a-102d. Accordingly, in some embodiments each of the client terminals 102a-102d share their respective public keys 202a-202d with each of the other client terminals 102a-102d through the central communication hub or mixer 203. In some embodiments, however, the mixer 203 is not used to share the public keys 202a-202d, and instead the client terminals 102a-102d may share their respective public keys 202a-202d with each other directly, through another third party device, or using one of the client terminals as a central sharing hub, In some embodiments, the client terminals 102a-102d may receive, along with or embedded within the groups of public keys 204a-204d, an authentication associated with each of the public keys 202a-202d to guarantee that the public keys are from intended or approved participants in the communication session.

The sharing of the public keys by each of the client terminals may be performed only once, for example, in a single batch prior to initiating communication sessions (e.g., a teleconference), or every time a client joins a communication session. The public keys may also be shared every time a communication session is organized.

After receiving public keys from each of the other client terminals, each of the client terminals generates a key switch hint 206a, 206b, 206c, and 206d, respectively, and shares the key switch hints 206a-206d with the mixer 203 prior to initiating a communication session. Depending on the type of encryption scheme used, the key switch hints 206a-206d may include additional information (e.g., embedded in the key switch hints). For example, in an example NTRU-based additive homomorphic encryption scheme, the key switch hints 206a-206d may include the ring dimension and ciphertext modulus. Each of the client terminals 102a-102d then use the key switch hints 206a-206d, respectively, to switch encrypted data streams generated during a communication session to a corresponding data representation.

Figure 3:
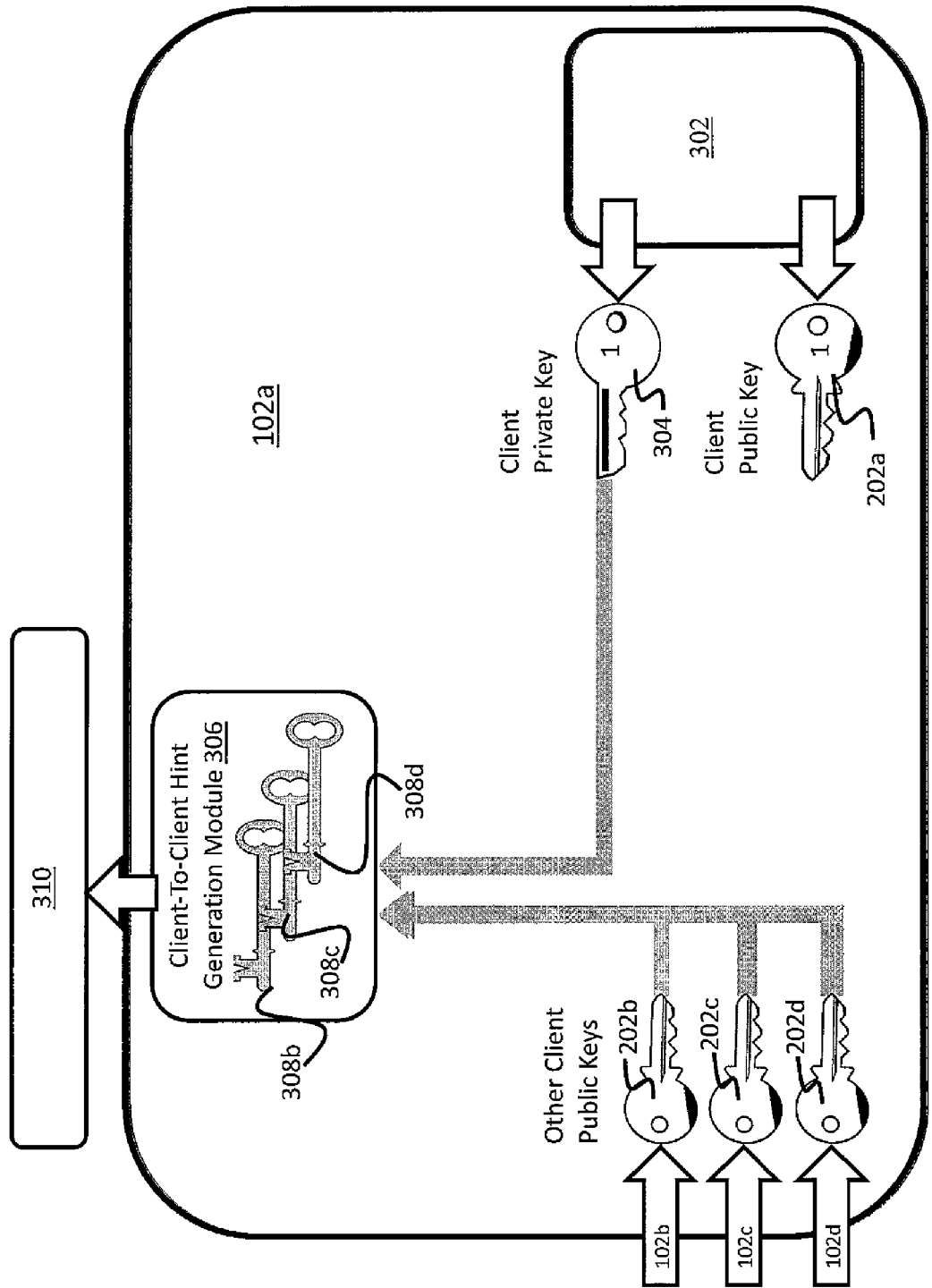
FIG. 3 illustrates an example of a hint generation approach, according to some embodiments of the present invention, according to some embodiments of the present invention.

FIG. 3 illustrates an example of a hint generation approach, according to some embodiments of the present invention. For every client terminal, a plurality of client-to-client key switch hints are generated and sent from that client terminal to the mixer. All the key switch hints, but none of the keys, are shared with the mixer. Each client terminal receives the public keys from each of the other client terminals, and uses its own private key to generate a plurality of client-to-client hints corresponding to each of the other client terminal. The plurality of client-to-client hints are then transmitted to a central communication hub or mixer prior to a communication session.

For example, as illustrated in FIG. 3, the client terminal 102a includes a key generator 302, which generates the public key 202a corresponding to the client terminal 102a, which is provided to each of the other client terminals 102b, 102c, and 102d. Each of the client terminals generates their own public key 202a-202d, respectively, according to the characteristics of the encryption/decryption algorithm.

Additionally, the client terminal 102a receives the public keys 202b, 202c, and 202d from each of the other client terminals 102b, 102c, and 102d, respectively. The client terminal 102a may receive the public keys 202b-20d from the other client terminals 102b-102d directly, or from another intermediate entity, for example, a central communication hub or mixer. The key generator 302 of the client terminal 102a further generates a client private key 304 according to the characteristics of the encryption scheme.

In some embodiments, the client terminals 102a-102d each generate their private keys, and then generate their respective public keys based on their private keys. For example, a given private key pr-k for an NTRU-based encryption scheme may have parameters p and q, which are randomly selected by selecting a pr-k∈R where R is a dimension-n ring such that pr-k=1 mod p and pr-k is invertible modulo q. The private key pr-k may be represented, for example, as an integer length-n vector.

The client private key pr-k is not shared with the other client terminals, but may be used to generate the public key for sharing with the other client terminals. For example, a given public key pub-k corresponding to a private key pr-k for an NTRU-based encryption scheme, the public key pub-k is generated from a g∈R where R is a dimension-n ring so that pub-k=g*pr-k^−1 mod q. The public key pub-k may be represented, for example, as an integer length-n vector.

The client terminal further includes a client-to-client hint generation module or circuit 306. Based on each of the other client public keys 202b-202d and the private key 304 of the client terminal 102a, the client-to-client hint generation module 306 generates a plurality of client-to-client key switch hints 308b, 308c, and 308d, using a suitable key switch hint generating procedure. Each of the client-to-client key switch hints 308b, 308c, and 308d corresponds to the other client terminals 102b, 102c, and 102d, respectively.

The key switch hint generation procedure depends on the encryption scheme used. For example, in the case of an NTRU encryption scheme, the key switch hints may be generated by converting a ciphertext of degree of at most d, encrypted under a public key f1, into a degree−1 ciphertext c2 encrypted under a secret key f2 (which may or may not be the same as f1). The "hint" is a12=m*f1^d*f2^−1 mod q for a short m∈R congruent to 1 modulo p. The hint generation process is a function with inputs f1 and f2. The value m=p*e+1 can be chosen for a Gaussian distributed e. The key switch operation is then defined as the function:

$$\text{KeySwitch}(c1, a12): c2 = a12 * c1 \mod q.$$

After generating the client-to-client hints 308b-308d, the client terminal 102a transmits them to a central communication hub or mixer 310, for switching encrypted data streams during a communication session. Accordingly, in one embodiment, neither the other client terminals 102b-102d nor the mixer 310 receive the client private key 304 of the client terminal 102a. Because the private keys are not shared, no other key switch hints can be generated that would allow delegation of decryption to another entity, thereby improving security and privacy of the communication session.

Figure 4:
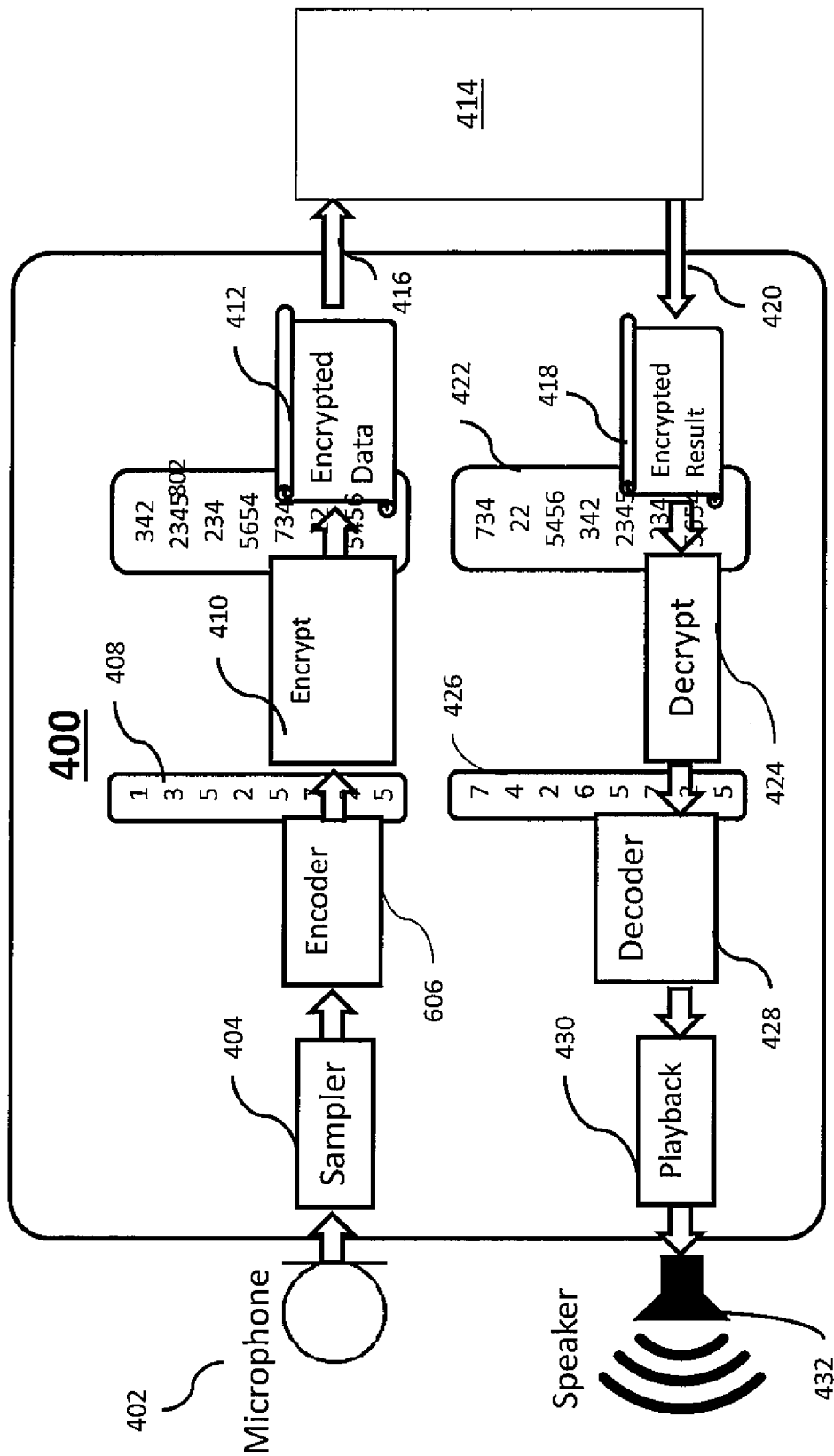
FIG. 4 illustrates an example of a data encryption and decryption scheme by a client, according to some embodiments of the present invention, according to some embodiments of the present invention.

FIG. 4 shows data encryption and decryption by a client, according to some embodiments of the present invention. In the embodiments illustrated by FIG. 4, the communication session relates to voice conferencing, although embodiments of the present invention are not limited to voice conferencing. In some embodiments, the communication session may include video conferencing, text messaging or chat room conferencing, or any other communication session in which users utilize client systems to exchange communication data.

The client terminal (or client) 400 illustrated in FIG. 4 includes a microphone 402, for capturing analog audio (e.g., voice communications from a user of the client 400). The client 400 further includes a sampler 404 for sampling the analog audio signals at regular or predetermined intervals. The client 400 further includes a linear encoder 406 for converting the sampled analog audio signals into digital data 408. The digital data 408 may be represented as a vector of values representing each sampled value of the analog audio signal at each of the intervals during the course of a frame of audio. The digital data 408 may additionally group one or more frames of data into packets prior to encryption.

The client 400 further includes an encryption unit 410, configured to encrypt the digital data 408 according to the encryption mechanism or scheme of a distributed communication system. For example, the encryption unit 410 may utilize an additive homomorphic encryption scheme using the secret key of the client 400. The encryption unit 410 may be any suitable encryption unit, computer system, processor, or microprocessor capable of performing real-time data encryption of the digital data 408 according to the requirements of the distributed communication system. The encryption unit 410 generates an encrypted data stream 412 corresponding to the digital data 408 using a suitable encryption scheme or algorithm. The encrypted data stream 412 may be represented as a vector of values corresponding to each value of the digital data 408. The particular encryption scheme or algorithm may be agreed upon by each of the clients engaging in a communication session prior to initiating the communication session.

The client 400 is in electronic communication with the central communication hub or mixer 414 by way of communication channel 416, and transmits the encrypted data stream 412 to the mixer 414. The mixer 414 similarly receives encrypted data streams from a plurality of other clients, and combines the encrypted data streams to generate an encrypted result data stream 418.

The mixer 414 then provides the encrypted result data stream 418 back to the client 400 by way of communication channel 420. The encrypted result data stream 418 may be represented as a vector of values corresponding to the values of the vectors of the encrypted data streams of the clients. The encrypted result data stream 418 may include a combination of all of the encrypted data streams provided by all of the clients during the communication session, or may include only some of the encrypted data streams. For example, in some embodiments, a particular client may not receive their own encrypted data stream as part of the encrypted result data stream.

The client 400 further includes a decryption unit 424, which decrypts the encrypted result data stream 418 to generate a decrypted data stream 426, according to the encryption scheme agreed upon by the clients or according to the design and function of the distributed communication system. The client 400 further includes a decoder 428, which receives the decrypted data stream 426, and decodes the decrypted data stream 426 to an appropriate format. For example, the decoder 428 may decode the decrypted data stream 426 to an analog audio signal that can be played back using a player or playback unit 430 to the user of the client terminal 400 using a speaker 432 of the client terminal 400. In the case of non-voice data communication, the decoded data is send to a desired destination, without any play back.

In some embodiments, a NTRU algorithm is used as a representational additive homomorphic encryption scheme which provides encryption and decryption functions.

Figure 5:
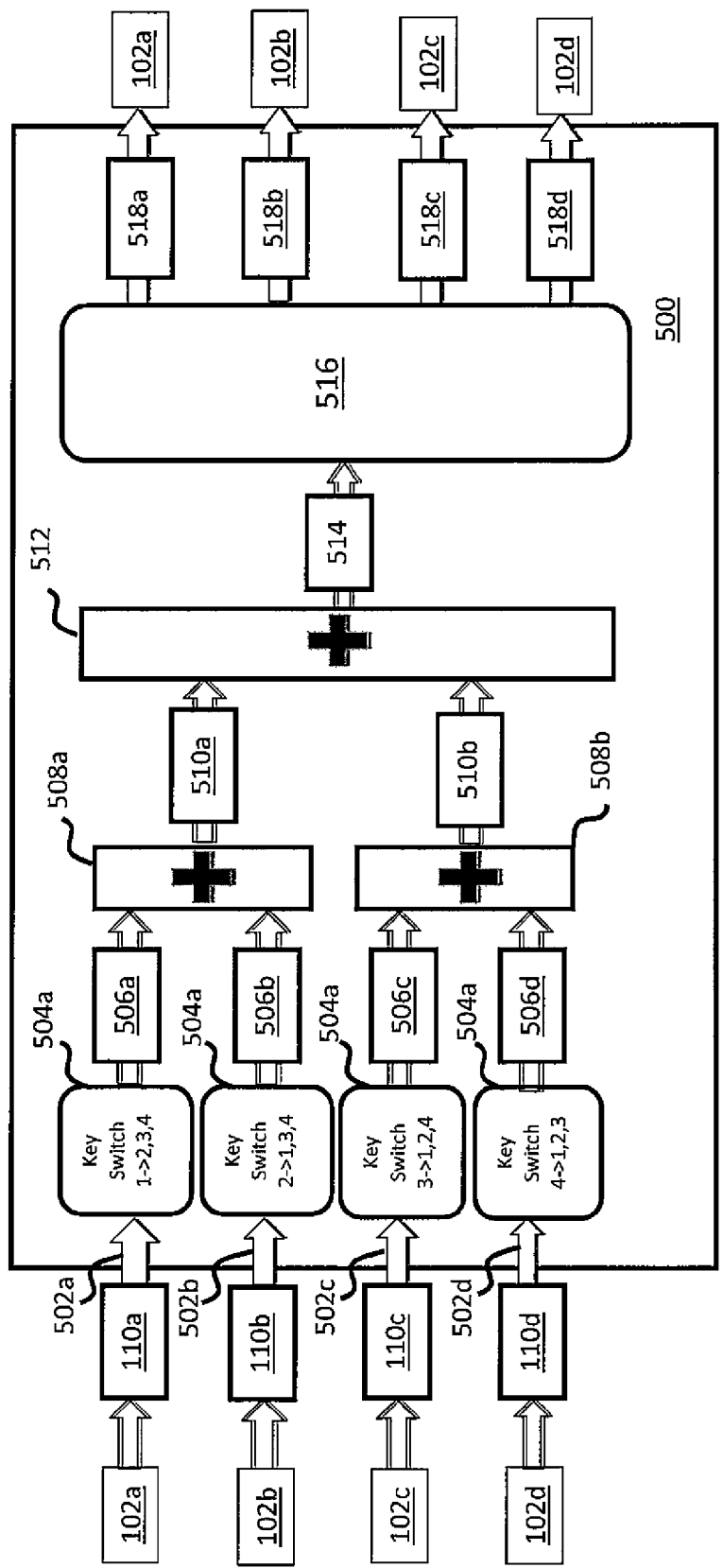
FIG. 5 illustrates an example of a block diagram of a communication hub or mixer according to some embodiments of the present invention.

FIG. 5 illustrates an example of a block diagram of a communication hub or mixer according to some embodiments of the present invention. As shown in FIG. 5, the communication hub or mixer 500 receives the encrypted data streams 110a-110d from each of the client terminals 102a-102d, respectively, through mixer inputs 502a-502d. Next, one or more key switch circuits perform a key switch operation on the encrypted data streams 110a-110d, using client-to-client key switch hints corresponding to each of the other client terminals, to generate a switched data set corresponding to each of the encrypted data streams.

For example, a key switch circuit 504a of the mixer 500 performs a key switch operation on the encrypted data stream 110a received from the client terminal 102a using client-to-client key switch hints received from, or corresponding to, each of the other clients 102b, 102c, and 102d, to generate a switched data set 506a.

The key switch operation for specific columns of data in the ciphertext matrices may then be defined as the function:

$$\text{KeySwitch}(c1, a12): c2 = a12 * c1 \mod q.$$

The input ciphertext c1 may be encrypted via some key f1 and the ciphertext may be represented, for example, as a vector of integers. The input key switch hint a12 may also be represented as a vector of integers and may be a hint which is used to switch ciphertexts encrypted under f1 to ciphertexts encrypted under f2, which corresponds to the intended receiver of that column of ciphertext data. The key switch operation may include performing an element-wise multiplication of the input ciphertext and the input key switch hint, modulo an integer q which is pre-shared with the mixer. Thus, the output may be a ciphertext c2 which is an encryption of the data encrypted in c1, but accessible by a holder of the key f2. This column-wise key switch process is repeated across all columns of the ciphertexts.

Similarly, key switch circuits 504b-504d perform a key switch operation on each of the other respective encrypted data streams using the client-to-client key switch hints received from the client terminals other than the client terminal from which the encrypted data streams were received, to generate switched data sets 506b-506d corresponding to the other client terminals 102b-102d, respectively. The key switch circuits 504a-504d may be separate components or the same component, and in one embodiment, the key switch circuits 504a-504d are part of a computer system or processor of the mixer 500.

Each of the switched data sets 506a-506d may be represented, for example, as a matrix of values, with each column corresponding to the encrypted data stream switched with a different key switch hint to form an encrypted data representation of the encrypted data streams. For example, the switched data set 506a may include three columns of values, in which the first column includes an encrypted data representation corresponding to the encrypted data stream 102a switched with the key switch hint corresponding to the client terminal 102b, the second column includes an encrypted data representation corresponding to the encrypted data stream 102a switched with the key switch hint corresponding to the client terminal 102c, and the third column includes an encrypted data representation corresponding to the encrypted data stream 102a switched with the key switch hint corresponding to the client terminal 102d.

The mixer 500 then combines or adds the switched data sets 506a-506d using a suitable summation scheme. For example, in one embodiment illustrated in FIG. 5, a summation of the switched data sets 506a-506d may be performed in a tree fashion, in which the switched data set 506a is combined with the switched data set 506b using an adder 508a to generate a combined data set 510a, and the switched data set 506c is combined with the switched data set 506d using an adder 508b to generate a combined data set 510b. Next, the combined data set 510a is mixed with the combined data set 510b using an adder 512 to generate a composite data set 514. In some embodiments, where the switched data sets 506a-506d are represented as matrices, the adders 510a and 510b may perform a matrix addition operation on the switched data sets 506a-506d to generate the combined data sets 510a and 510b. Similarly, the adder 512 may perform a matrix addition operation on the combined data sets 510a and 510b to generate the composite data set 514.

The addition process may be represented, for example, by the equation:

$$\text{Addition}(c', c): c'' = c' + c \bmod q$$

for specific columns of the ciphertext matrices, where two input ciphertexts of the same dimension c' and c are represented as equal-size integer matrices. The output is the ciphertext c" which is the element-wise addition of c' and c, mod an integer q which is pre-supplied to the mixer. This column-specific operation is repeated across all columns of the ciphertext matrices. This process may be repeated for every addition step in the mixer.

The composite data set 514 is then provided to a de-multiplexer 516 of the mixer 500 to de-multiplex the composite data set 514 to provide encrypted output data streams 518a, 518b, 518c, and 518d to each of the client terminals 102a-102d, respectively. The resulting ciphertext (e.g., the output encrypted data stream 518a-518d), can then be decrypted, decoded, and hosted (e.g., played back) by the intended client using their respective client private keys. The decryption function for a ciphertext c and secret key sk may be performed, for example, according to the function:

$$\text{Dec}(sk=f, c \in Rq)$$

where $b = f*c \bmod q$, lifted to the integer polynomial $b \in R$ with coefficients in $[-q/2, q/2)$. The output may then be the vector $\mu = b \bmod p$, which is an integer vector of length n.

In some embodiments, a communication session (e.g., a VoIP teleconference) may include a plurality of client terminals c1, c2, C3, ..., cM, and the user of each client terminal may want to receive the encrypted data streams from each of the other clients. Thus, the user of a client terminal ci may way to receive, as the output encrypted data stream, a composite of the encrypted data streams from the clients c1+c2+ ... +ci−1+ci+1+ ... +cm. Accordingly, referring, for example to FIG. 5, the encrypted data streams 110a-110d may be combined, for example, in a tree fashion. The switching operation performed, for example, by the key switch circuits 504a-504d, in conjunction with the mixing operation performed by the adders 508a, 508b, and 512, generates the composite data set 514, which includes a matrix of ciphertext where the i-th column is the source ciphertext delegated to the i-th client terminal. Then the de-multiplexer 516 isolates the i-th column of the composite data set 514 during the de-multiplexing operation, and provides the i-th column to the corresponding i-th client terminal as the output encrypted data stream. The i-th column could be a zero vector if the corresponding i-th client terminal should not receive the source data.

Figure 6A:
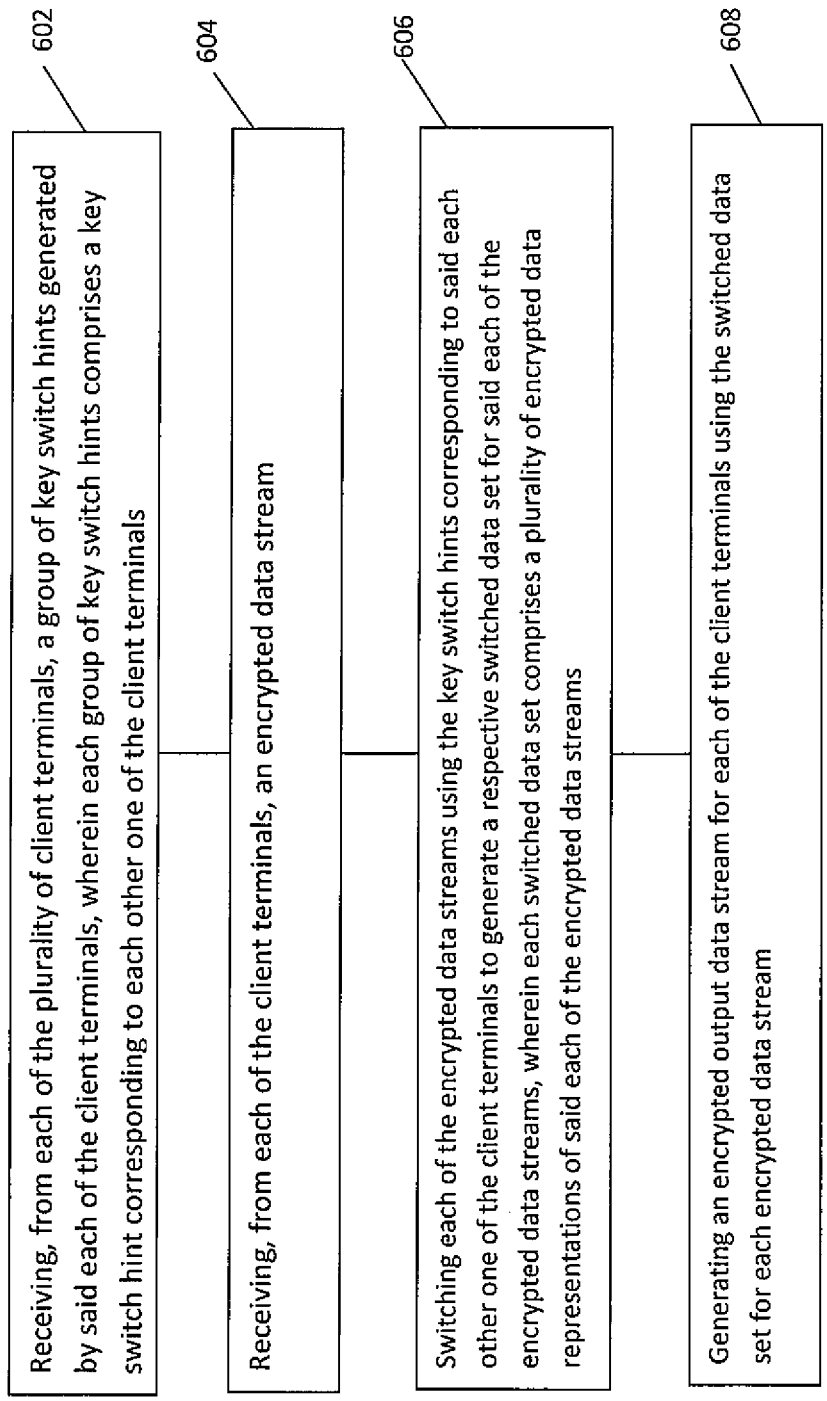
FIGS. 6A-6C illustrate examples of process flows, according to some embodiments of the present invention.
Figure 6B:
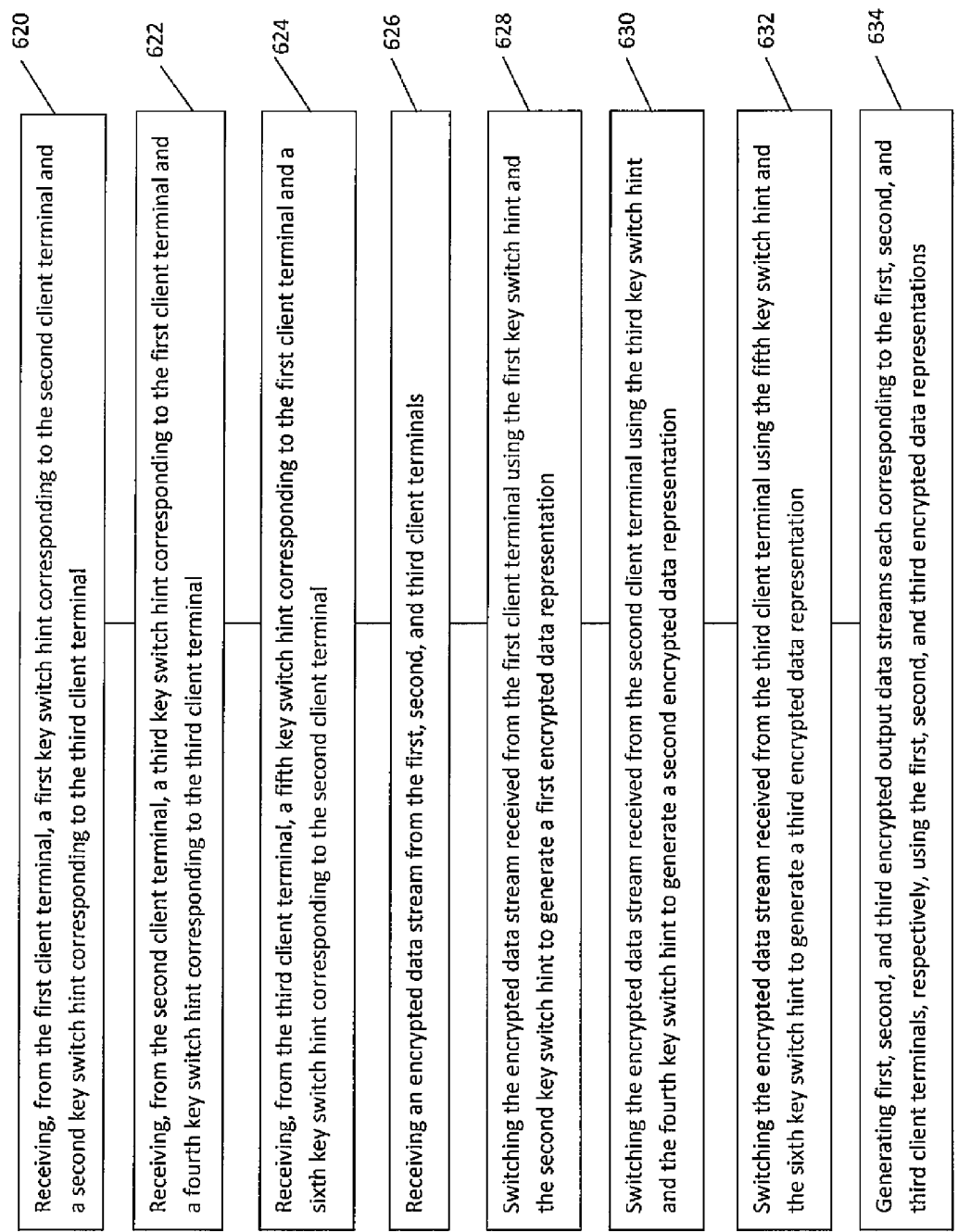
Figure 6C:
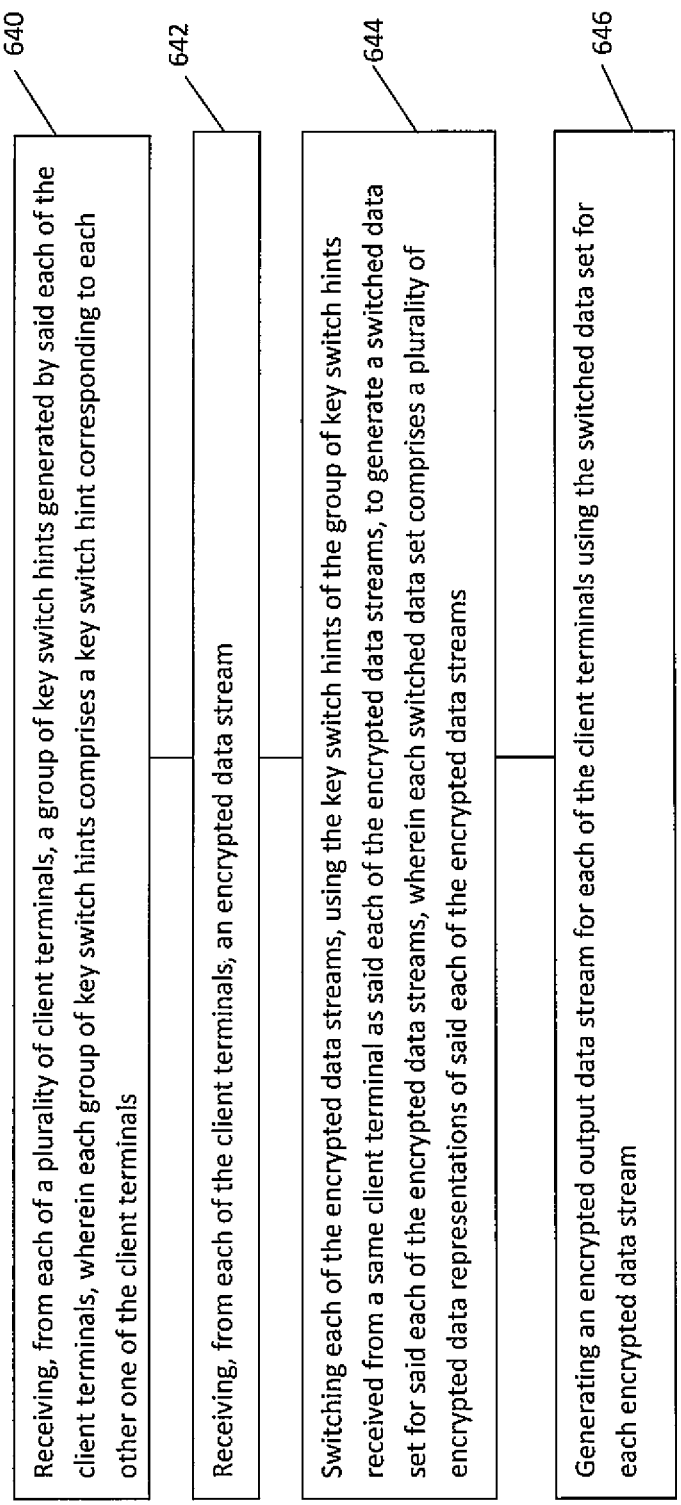

FIGS. 6A, 6B, and 6C illustrate example process flows according to some embodiments of the present invention. In FIG. 6A, an example process flow of computer implemented method for data privacy in a distributed communication system including a plurality of client terminals is shown. In block 602, a group of key switch hints generated by said each of the client terminals is received from each of the plurality of client terminals, wherein each group of key switch hints includes a key switch hint corresponding to each other one of the client terminals. In block 604, an encrypted data stream is received from each of the client terminals. In block 606, each of the encrypted data streams is switched using the key switch hints corresponding to said each other one of the client terminals to generate a respective switched data set for said each of the encrypted data streams, wherein each switched data set includes a plurality of encrypted data representations of said each of the encrypted data streams. In block 608, an encrypted output data stream is generated for each of the client terminals using the switched data set for each encrypted data stream.

In FIG. 6B, an example process flow of a computer implemented method for data privacy in a distributed communication system coupled to first, second, and third client terminals is shown. In block 620, a first key switch hint corresponding to the second client terminal and a second key switch hint corresponding to the third client terminal are received from the first client terminal. In block 622, a third key switch hint corresponding to the first client terminal and a fourth key switch hint corresponding to the third client terminal are received from the second client terminal. In block 624, a fifth key switch hint corresponding to the first client terminal and a sixth key switch hint corresponding to the second client terminal are received from the third client terminal. In block 626, an encrypted data stream is received from the first, second, and third client terminals. In bock 628, the encrypted data stream received from the first client terminal is switched using the first key switch hint and the second key switch hint to generate a first encrypted data representation. In block 630, the encrypted data stream received from the second client terminal is switched using the third key switch hint and the fourth key switch hint to generate a second encrypted data representation. In block 632, the encrypted data stream received from the third client terminal is switched using the fifth key switch hint and the sixth key switch hint to generate a third encrypted data representation. In block 634, first, second, and third encrypted output data streams are generated, each corresponding to the first, second, and third client terminals, respectively, using the first, second, and third encrypted data representations.

In FIG. 6C, an example process flow of a computer implemented method for data privacy in a distributed communication system is shown. In block 640, a group of key switch hints is received from each of a plurality of client terminals, wherein each group of key switch hints is generated by said each of the client terminals, wherein each group of key switch hints includes a key switch hint corresponding to each other one of the client terminals. In block 642, an encrypted data stream is received from each of the client terminals. In block 644, each of the encrypted data streams is switched, using the key switch hints of the group of key switch hints received from a same client terminal as said each of the encrypted data streams, to generate a switched data set for said each of the encrypted data streams, wherein each switched data set includes a plurality of encrypted data representations of said each of the encrypted data streams. In block 646, an encrypted output data stream is generated for each of the client terminals using the switched data set for each encrypted data stream.

It will be recognized by those skilled in the art that various modifications may be made to the illustrated and other embodiments of the invention described above, without departing from the broad inventive scope thereof. It will be understood therefore that the invention is not limited to the particular embodiments or arrangements disclosed, but is rather intended to cover any changes, adaptations or modifications which are within the scope and spirit of the invention as defined by the appended claims.

What is claimed is:

1. A computer implemented method for data privacy in a distributed communication system comprising a plurality of client terminals, the method comprising:
   receiving, from each of the plurality of client terminals, a group of key switch hints generated by said each of the client terminals, wherein each group of key switch hints comprises a key switch hint corresponding to each other one of the client terminals;
   receiving, from each of the client terminals, an encrypted data stream;
   switching each of the encrypted data streams using the key switch hints corresponding to said each other one of the client terminals to generate a respective switched data set for said each of the encrypted data streams, wherein each switched data set comprises a plurality of encrypted data representations of said each of the encrypted data streams; and
   generating an encrypted output data stream for each of the client terminals using the switched data set for each encrypted data stream.

2. The method of claim 1, further comprising:
   receiving a public key corresponding to each of the plurality of client terminals; and
   providing, to each of the client terminals, the public key corresponding to said each other one of the client terminals.

3. The method of claim 2, wherein for each group of key switch hints, the key switch hint corresponding to said each other one of the client terminals is generated based on the public key corresponding to said each other one of the client terminals and a private key generated by a client terminal corresponding to the said each group of key switch hints.

4. The method of claim 1, wherein generating the encrypted output data stream further comprises generating a composite switched data set based on the switched data set corresponding to each switched data set.

5. The method of claim 4, further comprising demultiplexing the composite switched data set to generate the encrypted output data stream corresponding to each of the client terminals.

6. The method of claim 5, wherein the composite switched data set comprises a matrix of the encrypted output data stream corresponding to each of the client terminals.

7. The method of claim 6, further comprising providing a row or a column of the matrix to a client terminal of the plurality of client terminals as the output encrypted data stream for the client terminal.

8. A computer implemented method for data privacy in a distributed communication system coupled to first, second, and third client terminals, the method comprising:
   receiving, from the first client terminal, a first key switch hint corresponding to the second client terminal and a second key switch hint corresponding to the third client terminal;
   receiving, from the second client terminal, a third key switch hint corresponding to the first client terminal and a fourth key switch hint corresponding to the third client terminal;
   receiving, from the third client terminal, a fifth key switch hint corresponding to the first client terminal and a sixth key switch hint corresponding to the second client terminal;
   receiving an encrypted data stream from the first, second, and third client terminals;
   switching the encrypted data stream received from the first client terminal using the first key switch hint and the second key switch hint to generate a first encrypted data representation; switching the encrypted data stream received from the second client terminal using the third key switch hint and the fourth key switch hint to generate a second encrypted data representation;
   switching the encrypted data stream received from the third client terminal using the fifth key switch hint and the sixth key switch hint to generate a third encrypted data representation; and
   generating first, second, and third encrypted output data streams each corresponding to the first, second, and third client terminals, respectively, using the first, second, and third encrypted data representations.

9. The method of claim 8, further comprising:
   receiving a first public key corresponding to the first client terminal;
   receiving a second public key corresponding to the second client terminal;
   providing the first public key to the second client terminal; and
   providing the second public key to the first client terminal.

10. The method of claim 9, wherein the first key switch hint is generated based on the second public key and a private key generated by the first client terminal.

11. The method of claim 8, further comprising:
    generating a composite switched data set comprising the first encrypted data representation, the second encrypted data representation, and the third encrypted data representation; and
    generating the first, second, and third encrypted output data streams based on the composite switched data set.

12. The method of claim 11, wherein the composite switched data set comprises a matrix, and wherein a first row or column of the matrix comprises the first encrypted output data stream.

13. The method of claim 11, further comprising demultiplexing the composite switched data set to generate the first, second, and third encrypted output data streams.

14. A central communication hub in a distributed communication system, the central communication hub comprising:
    an input port for receiving a first group of key switch hints and a first encrypted data stream;
    one or more switching circuits configured to switch the first encrypted data stream using the first group of key switch hints to generate a first switched data set;
    a demultiplexer for generating an encrypted output data stream using the first switched data set; and
    an output terminal for providing the encrypted output data stream to a client terminal.

15. The communication hub of claim 14, wherein the input port is configured to receive a second group of key switch hints and a second encrypted data stream, and wherein the one or more switching circuits are configured to switch the second encrypted data stream using the second group of key switch hints to generate a second switched data set.

16. The communication hub of claim 15, further comprising one or more adders for generating a composite data set based on the first switched data set and the second switched data set.

17. The communication hub of claim 15, wherein the distributed communication system comprises a plurality of client terminals, and wherein the first group of key switch hints are generated by a first client terminal of the plurality of client terminals and the first group of key switch hints corresponds to other ones of the plurality of client terminals.

18. The communication hub of claim 14, wherein the distributed communication system comprises a plurality of client terminals each comprising a key generator for generating a public key and a private key.

19. The communication hub of claim 18, wherein the plurality of client terminals further comprise an input port for receiving the public key corresponding to each other one of the client terminals.

20. The communication hub of claim 19, wherein the first group of key switch hints is generated based on the private key of the a first one of the plurality of client terminals and the public key of said each other one of the plurality of client terminals.

* * * * *